(12) United States Patent
Underwood et al.

(10) Patent No.: US 6,713,106 B1
(45) Date of Patent: Mar. 30, 2004

(54) METHOD OF MAKING BACON PRODUCTS

(75) Inventors: Gary L. Underwood, Manitowoc, WI (US); Jeffrey J. Rozum, Cato, WI (US)

(73) Assignee: Red Arrow Products Company LLC, Manitowoc, WI (US)

( * ) Notice: Subject to any disclaimer, the term of this patent is extended or adjusted under 35 U.S.C. 154(b) by 414 days.

(21) Appl. No.: 09/742,663

(22) Filed: Dec. 21, 2000

Related U.S. Application Data

(63) Continuation-in-part of application No. 09/296,140, filed on Apr. 21, 1999, now abandoned.

(51) Int. Cl.$^7$ .............................................. A23L 1/314
(52) U.S. Cl. ..................... 426/264; 426/266; 426/302; 426/641; 426/652
(58) Field of Search ................................ 426/264, 266, 426/302, 641, 652

(56) References Cited

U.S. PATENT DOCUMENTS

| | | | |
|---|---|---|---|
| 3,220,854 A | 11/1965 | Zwart | 426/264 |
| 3,595,679 A | 7/1971 | Schoch et al. | 426/264 |
| 3,868,468 A | 2/1975 | Tompkin et al. | 426/243 |
| 4,094,237 A | 6/1978 | Riordan | 99/451 |
| 4,434,187 A | 2/1984 | Chandler et al. | 426/652 |
| 4,463,026 A | 7/1984 | Chandler et al. | 426/652 |
| 4,463,027 A | 7/1984 | Chandler et al. | 426/652 |
| 4,957,756 A | 9/1990 | Olander et al. | 426/266 X |
| 5,071,666 A | 12/1991 | Handel et al. | 426/281 |
| 5,997,925 A | 12/1999 | Wilson et al. | 426/332 |

*Primary Examiner*—Arthur L. Corbin
(74) *Attorney, Agent, or Firm*—Marshall, Gerstein & Borun LLP

(57) ABSTRACT

A method of making a bacon product from a frozen bacon belly is disclosed. The method includes the steps of cutting the frozen bacon belly into slices of a predetermined shape, and coating the bacon slices with an aqueous brine solution to result in a brine solution uptake in each of the bacon slices of about 8 wt. % to about 15 wt. %. The bacon slices have a sodium nitrite content of about 18 ppm up to about 80 ppm. The method also includes the step of heating the brine-soaked bacon slices to form the bacon product. An aqueous brine solution includes a salt (e.g., sodium chloride), a low amount of sodium nitrite or sodium nitrate, and a phosphate. Optionally, the brine solution can include one or more materials selected from the group consisting of sugar, sodium ascorbate, and an agent for imparting a smoke flavor to the bacon product.

25 Claims, 1 Drawing Sheet

METHOD OF MAKING BACON PRODUCTS

RELATED APPLICATIONS

This is a continuation-in-part application of U.S. application Ser. No. 09/296,140, filed Apr. 21, 1999, now abandoned.

BACKGROUND OF THE INVENTION

FIELD OF THE INVENTION

The invention relates to an improved method of manufacturing bacon products.

BRIEF DESCRIPTION OF RELATED TECHNOLOGY

The popularity of bacon continues to increase because of the favorable Flavor that bacon adds to a diverse range of foods. Accordingly, restaurant use of bacon has grown substantially as consumer demand for a bacon flavor in food items has increased. However, cooking bacon by frying is a somewhat tedious and untidy process that produces odoriferous fumes and grease spattering, and often results in more waste fat than edible bacon. The introduction of "prefried" bacon in the mid-1980s addressed this problem, and has become a necessary commodity in many restaurants trying to satisfy consumer demand. In the manufacture of prefried bacon, a bacon product is prepared by the steps of brine injection and smokehouse processing. The bacon belly then is sliced, and the slices are fried in continuous fry ovens. Thereafter, the fried bacon strips are packaged and frozen for shipment.

Traditional bacon manufacturing therefore is a multistep, time consuming process involving the process of either dry curing or wet curing a bacon belly. In a dry curing process, meat curing additives, such as curing salts, nitrites, and other conventional curing additives are applied in the dry state directly to the surface of the meat. A disadvantage of the dry curing process is that it is difficult to distribute a dry curing composition evenly onto the bacon bellies. Accordingly, most bacon products are made by methods employing a wet curing process. In a wet curing process, a brine solution containing various additives is injected at various locations into the bacon bellies through tubular needles to provide a more rapid cure and a more even distribution of the additive-containing brine solution. The wet curing process, like the dry curing process, has the disadvantage of being time consuming, and additives are necessary to provide a desirable cure. An additional major disadvantage of the wet curing process is that the finished bacon products typically display dark-colored marks caused by the brine injection needles.

Brine solutions used to cure bacon products typically include sodium chloride, potassium chloride, sodium nitrite, sodium ascorbate, a phosphate, corn syrup, and a sugar. An agent for imparting a smoke flavoring to the finished bacon product (e.g., a liquid smoke composition) also can be present in the brine solution. Sodium ascorbate is present in the brine solution to accelerate the cure and prevent undesirable oxidation. A phosphate is present to increase the uptake of brine into the bacon bellies. Sugar is present in the brine solution to impart a sweet taste to the finished bacon product. Sodium nitrite improves the quality and taste of the bacon product, and inhibits the growth of deadly Clostridium species during storage of the bacon product prior to consumption. It is known, however, that a chemical reaction occurs between certain types of amines naturally present in the bacon bellies and the sodium nitrite added to the bacon bellies when the bacon product is cooked (i.e., heated). This chemical reaction yields carcinogenic N-nitrosamines. Successful prior art methods of suppressing the formation of carcinogenic N-nitrosamines in bacon products include the use of the d-isomer of $\alpha$-tocopherol (i.e., Vitamin E) as an additive in the brine solution.

In the wet curing process of manufacturing bacon, it is important that a proper amount of brine solution is evenly distributed throughout the bacon belly. If too much brine solution is injected, the resulting bacon product has an excessively salty taste and/or has a localized nitrite level in excess of desirable, or regulated, amounts. If too little brine solution is injected, then the resulting bacon product has an undesirably bland and/or otherwise unacceptable taste. Additionally, the amount of injected brine contributes to the texture and color of the finished bacon product. Accordingly, a uniform injection of the brine solution helps ensure that the finished bacon product displays a consistent texture and color.

Following injection of the brine solution, the pumped bellies are hung for several minutes prior to weighing, then transferred to a smokehouse. The bellies are hung in smokehouses for several hours (typically about 4 to about 7 hours), and processed to an internal temperature of about 50° C. (122° F.) to about 55° C. (131° F.). At this temperature, the injected bacon bellies remain preserved due to the presence of the sodium nitrite, and are free of trichina. Several hours of smokehouse time at this temperature are required to process the bacon bellies without melting fat, to return the bacon bellies to their original green weight (i.e., the weight of a bacon belly prior to the brine solution injection step), and to impart a smoked flavor to the finished bacon product. Additional dark-colored markings however can appear on the finished bacon product due to stress cracks formed by hanging the pumped bellies. After the smokehouse processing step, the bacon product is sliced, packaged, and frozen for shipment.

In view of the foregoing, it would be desirable to provide a method of manufacturing a bacon product that requires fewer process steps than the processes described above and others that are known in the art. Furthermore, it would be desirable to eliminate the presence of dark-colored marks on the finished bacon product caused by needles or stress cracks. Still further, it would be desirable to provide a method of manufacturing a bacon product by a less expensive process. For example, it would be desirable to provide a faster method of preparing a bacon product and to eliminate, or reduce the amount of, one or more components of the brine solution without compromising the quality, taste, and safety of the finished bacon product.

SUMMARY OF THE INVENTION

The present invention is directed to a method of making a bacon product from a frozen bacon belly, wherein the method includes the steps of cutting the frozen bacon belly to slices of predetermined dimensions, and coating the bacon slices with a brine solution, such that each bacon slice has a brine uptake of about 8 percent by weight (wt. %) to about 15 wt. %, based on the weight of the frozen bacon belly, and has a sodium nitrite content of about 18 parts per million (ppm) up to about 80 ppm. The method also includes the further step of heating the brine-soaked bacon slices to form a bacon product.

A suitable brine solution for use in accordance with the invention is an aqueous solution containing a salt (e.g., potassium chloride or sodium chloride), a low amount of sodium nitrite, and, optionally, a phosphate. More specifically, a suitable aqueous brine solution for use in accordance with the present invention includes about 10 wt. % to about 20 wt. % of sodium chloride based on the total weight of the brine solution, about 0.015 wt. % to about 0.045 wt. % of sodium nitrite, based on the total weight of the brine solution, and, 0 wt. % to about 1 wt. % of a phosphate based on the total weight of the brine solution. Alternatively, sodium nitrate can be used as a substitute, either wholly or in part, for the sodium nitrite. The brine solution optionally can include one or more materials selected from the group consisting of sugar, sodium ascorbate, and an agent for imparting a smoke flavor to the bacon product, such as a liquid smoke composition. Typically, the aqueous brine solution includes about 70 wt. % to about 90 wt. % water, based on the total weight of the brine solution.

Further objects and advantages of the invention will become apparent to those skilled in the art from the following detailed description, taken in conjunction with the examples and the appended claims.

DETAILED DESCRIPTION OF THE PREFERRED EMBODIMENTS

Figure 1:
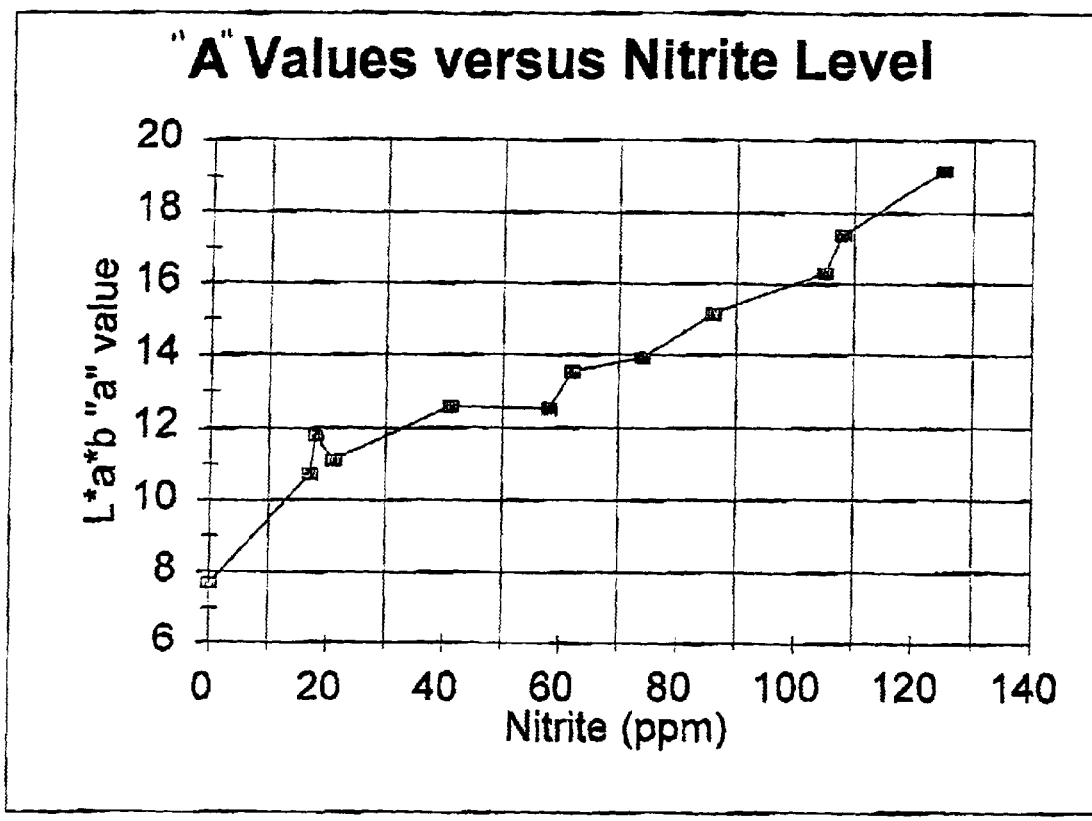
FIG. 1 contains a graph of the measured "a" value of a cooked bacon product vs. sodium nitrite content (ppm) in an uncooked bacon slice manufactured in accordance with the present invention.

The present invention is directed to a method of making a bacon product from a frozen bacon belly, wherein the method includes the steps of slicing the frozen bacon belly to slices of predetermined dimensions, and coating the bacon slices with a brine solution, such that each bacon slice has a brine uptake of about 8 percent by weight (wt. %) to about 15 wt. %, based on the weight of the frozen bacon belly, and has a sodium nitrite content of about 18 parts per million (ppm) up to about 80 ppm. The method also includes the further step of heating the brine-soaked bacon slices to form a bacon product.

A suitable brine solution for use in accordance with the invention is an aqueous solution containing a salt (e.g., potassium chloride or sodium chloride), a low amount of sodium nitrite, and a phosphate. More specifically, a suitable aqueous brine solution for use in accordance with the invention includes about 10 wt. % to about 20 wt. % of a salt, e.g., sodium chloride, based on the total weight of the brine solution, about 0.015 wt. % to about 0.045 wt. % of sodium nitrite, based on the total weight of the brine solution, and 0 wt. % to 1 wt. % of a phosphate based on the total weight of the brine solution. The brine solution optionally can include one or more materials selected from the group consisting of sugar, sodium ascorbate, and an agent for imparting a smoke flavor to the bacon product, such as a liquid smoke composition. Preferably, the aqueous brine solution includes about 70 wt. % to about 90 wt. % water based on the total weight of the brine solution.

In accordance with the present invention, the frozen bacon belly is maintained at a temperature sufficient to freeze the belly, typically at a bacon belly internal temperature of about minus 10° C. or less, such as at about minus 35° C. to about minus 15° C., and preferably about minus 26° C. to about minus 20° C. While frozen, the belly is trimmed and shaped to desired dimensions. The frozen bellies can be formed into any predetermined shape. Preferably, however, the bellies are formed into slices having a thickness of about 0.5 mm to about 4 mm, more preferably about 1 mm to about 2 mm. The frozen, trimmed bellies can be shaped to the desired dimensions using a conventional bacon slicer, for example.

After the frozen bellies are sliced, a brine solution is applied to each of the individual, frozen bacon slices. Preferably, the solution is applied to the bacon slices at a temperature of about minus 18° C. to about 0° C., more preferably at a temperature of about minus 10° C. to about minus 4° C. The solution can be applied by spraying or, alternatively, the slices can be drenched or immersed in the brine solution for a sufficient time such that the bacon slices exhibit a weight increase of about 8 wt. % to about 15 wt. %, more preferably about 10 wt. % to about 12 wt. %. A typical time period for a 1 mm to 2 mm bacon slice to exhibit such a weight increase is about 5 to about 10 seconds at a temperature of about minus 10° C. to about minus 4° C.

The brine solution is maintained at a pH of about 4.5 to about 7, and preferably about 5.5 to about 6.5, to ensure that sufficient nitrite ion is present in the brine solution, and thereby prevent the production of potentially toxic nitrogen dioxide.

The nitrite content of the bacon slices is about 18 ppm up to about 80 ppm, preferably about 20 to about 75 ppm, more preferably about 20 to about 60 ppm, still more preferably about 20 to about 50 ppm, and even more preferably about 20 ppm to about 40 ppm. It has been found that a nitrite content of about 20 to about 75 ppm is preferred to ensure a bright, cured appearance, and to impart a desirable flavor to the finished bacon product.

After the brine solution has been applied to the bacon slices such that the slices exhibit a brine uptake of about 8 wt. % to about 15 wt. %, the slices are heated. Preferably, the slices are heated in a continuous microwave oven or in a gas-fired oven. The slices are heated sufficiently to provide a finished product (i.e., cooked slices) having a weight percent yield of about 20% to about 50% and preferably about 25% to about 40%, based on the weight of the raw bacon belly. The yield can be adjusted according to the color consistency desired of the finished product. At higher yields, the brown cooked color of the bacon is less than at lower yields, where a higher cooked temperature is reached. The bacon color can be increased by using a higher concentration of smoke flavoring agents, or by using a smoke flavoring having a higher browning potential.

A suitable aqueous brine solution for use in accordance with the present invention includes water, a salt (e.g., sodium chloride, potassium chloride, and mixtures thereof), a low amount of sodium nitrite, and, optionally, a phosphate. More specifically, a suitable brine solution for use in accordance with the invention includes about 70 wt. % to about 90 wt. % water, based on the total weight of the brine solution, about 10 wt. % to about 20 wt. % of sodium and/or potassium chloride, based on the total weight of the brine solution, about 0.015 wt. % to about 0.045 wt. % of sodium nitrite, based on the total weight of the brine solution, and 0% to about 1 wt. % of a phosphate, based on the total weight of the brine solution. Preferably, the brine solution includes about 0.02 wt. % to about 0.03 wt. % of sodium nitrite, based on the total weight of the brine solution. Alternatively, sodium nitrate can be substituted, wholly or in part, for the sodium nitrite. The brine solution optionally can include one or more materials selected from the group consisting of sugar, sodium ascorbate, and an agent for imparting a color and/or smoke flavor to the bacon product (e.g., a liquid smoke composition).

The amount and type of smoke flavoring agent used in the brine solution is driven by consumer acceptance. A preferred smoke flavoring agent for use in accordance with the present invention has sufficient browning potential to impart a consistent color to the finished bacon product. Generally smoke flavoring agents having a low flavor and a high browning potential are preferred. A brine solution containing about 1 wt. % to about 8 wt. % of CHARSOL® LFBN, available from Red Arrow Products Co., LLC. of Manitowoc, Wis., provides sufficient flavor and color to the finished bacon product for consumer acceptance. Another smoke flavoring agent, such as AROSMOKE P50®, also available from Red Arrow Products Co., LLC., can be included for additional flavoring.

An example of a preferred aqueous brine solution for use in accordance with the invention includes about 78 wt. % water, about 15 wt. % sodium chloride, about 0.028 wt. % sodium nitrite, about 5.8 wt. % liquid smoke composition, and about 0.5 wt. % tetrasodium pyrophosphate, based on the total weight of the brine solution.

Bacon products made by the present method are free of the undesirable dark-colored marks found in bacon slices made by prior methods because needles are not used to apply the brine solution. Furthermore, the bacon product also is free of dark-colored marks because the bacon bellies are not hung in smokehouses during cure. The present method also avoids the costly and time consuming step of heating the bacon bellies to temperatures of about 50° C. (122° F.) to about 55° C. (131° F.), as taught by the prior art, to achieve an acceptable bacon product. Additionally, a brine solution used in accordance with the present method contains substantially less of the potentially hazardous sodium nitrite than required in prior art processes. Furthermore, because the intermediate process step of hanging the bellies in a smokehouse is eliminated, the brine solution does not contain any additives to prevent the formation of N-nitrosamines. Hence, a brine solution used in accordance with the present invention eliminates one of the conventional raw material constituents used in prior brine solutions.

EXAMPLES

The following nonlimiting examples are provided to illustrate the invention, but are not intended to limit the scope thereof.

Example 1

Tests were performed to determine a suitable concentration range of sodium chloride in the brine solution.

An initial aqueous brine solution, containing about 23 wt. % sodium chloride in water, was prepared. Frozen side pork was sliced to a thickness of about 1 mm to 2 mm. This method is in contrast to present-day methods that slice the pork at 26° F. to 40° F. The slices were immersed into the brine solution (which was maintained at 10° C.) for about fifteen seconds, then allowed to drip for fifteen seconds. The amount of brine uptake was 8.5%, based on the weight of the frozen pork belly. The brine-soaked pork slices then were heated in a conventional household microwave oven until about a 30–35% yield was achieved. The approximate heating time was about two minutes to about three minutes depending on the number and thickness of the pork slices being prepared. A finished bacon product made with this brine solution was very salty by flavor analysis.

A second aqueous brine solution containing about 15 wt. % sodium chloride in water was prepared. Side pork was sliced to a thickness of about 1 mm to 2 mm, and was treated and heated by the method set forth above. A finished bacon product made with this brine solution provided a very acceptable salt flavor as determined by flavor analysis. Based on testing brine solutions having varying sodium chloride concentrations, it was determined the brine solution should contain about 10 wt. % to about 20 wt. %, preferably about 12 wt. % to about 18 wt. %, and more preferably about 13 wt. % to about 17 wt. % sodium chloride based on the total weight of the aqueous brine solution, to achieve a consumer acceptable taste.

Example 2

Tests were performed to determine a suitable drench/immersion time in a brine solution to achieve a desired brine solution uptake.

It was determined that a 15-second immersion time period used in Example 1 would be impractical for processing side pork in a commercial production process. Therefore, shorter immersion times were investigated using an aqueous brine solution containing about 15 wt. % salt and 6 wt. % smoke flavoring (i.e., CHARSOL® LFBN, a liquid smoke composition). Frozen side pork was cut into slices having a thickness of about 1 mm to about 2 mm. The slices were immersed in the brine solution for about five to ten seconds, then allowed to drip for fifteen seconds. All studies in which the slices were immersed in the solution for about five to ten seconds resulted in a brine solution-uptake of about 7.1 wt. % to about 15 wt. %, and typically an uptake of about 8 wt. % to 10 wt. %. Such a brine solution uptake corresponds to a sodium chloride uptake of about 1.2 wt. % to about 1.5 wt. %.

The slices were immersed in the brine solution for a variable time period, allowed to drip for about fifteen seconds, and then heated in a conventional household microwave until about a 30–35% yield was achieved. The approximate heating time was about two to three minutes depending on the number and thickness of the slices being prepared. A finished bacon product made with this brine solution exhibited an appropriate level of saltiness as determined by flavor analysis. Based on the various immersion times and the thickness of the slices, it was determined that the slices should be immersed in the brine solution for about five to ten seconds, and preferably for more than about five seconds to less than about ten seconds, e.g., six to nine seconds, to ensure an adequate brine uptake.

Example 3

Tests were performed to determine a suitable temperature at which to apply a brine solution to individual pork slices.

Sliced side pork (2–3 mm thick strips) maintained at a temperature of minus 20° F. (minus 29° C.) were immersed into a 15 wt. % brine solution maintained at about −10° C. The immersed slices were allowed to drip for about fifteen seconds, and then heated in a conventional household microwave oven until about a 30–35% yield was achieved. The approximate heating time was about two minutes to three minutes depending on the number and thickness of the slices being prepared. These slices had a brine solution uptake of about 8.1 wt. % to about 9.9 wt. % based on the total weight of the slices. Additionally, strips of sliced pork were allowed to thaw until sufficiently pliable such that the strips did not break when bent (about minus 5° F. (minus 20° C.)), then the strips were immersed into the brine solution. These slices had a brine uptake of about 9.9 wt. % to about 11.4 wt. %. The slices of side pork can be maintained at a freezing temperature of about minus 15° F. (minus 26° C.) to a semi-thawed temperature of about minus 5° F. (minus 20° C.), and still acquire the appropriate amount of brine in the desired time.

Example 4

Tests were performed to determine whether sodium nitrite is a necessary ingredient in the brine solution with respect to modifying the color and flavor of the finished bacon product.

A first aqueous brine solution containing about 15 wt. % sodium chloride, based on the total weight of the solution, 6 wt. % smoke flavoring (i.e., 4% AROSMOKE P50® and 2% CHARSOL® LFBN), based on the total weight of the solution, and about 120 ppm of sodium nitrite was prepared. Side pork was sliced to a thickness of about 1 mm to 2 mm, then the strips were dipped into the brine solution for about fifteen seconds, and allowed to drip for about fifteen seconds. Next, the strips were heated in a conventional household microwave until a yield of about 30–35% was achieved.

A second, identical brine solution containing about 15 wt. % sodium chloride, based on the total weight of the solution, and about 6 wt. % smoke flavoring, based on the total weight of the solution was prepared, except sodium nitrite was not present in this brine solution. Side pork was sliced to a thickness of about 1 mm to about 2 mm, then the strips were immersed into the brine solution for about fifteen seconds, allowed to drip for about fifteen seconds. Next, the strips were heated in a conventional household microwave oven until about a 30–35% yield was achieved.

Slices coated with the second brine solution appeared brown and dull after heating. Slices coated with the first brine solution displayed a reddish-cured color after heating. A consumer organoleptic evaluation study indicated that sodium nitrite was important with respect to imparting an acceptable bacon-like appearance to the finished product. The evaluation also indicated that the flavor of the finished product produced with the first brine solution was superior to the flavor of the bacon product made with the second brine solution. Accordingly, sodium nitrite also is important with respect to imparting an acceptable color and flavor to the finished bacon product.

Example 5

Tests were performed to determine the amount of sodium nitrite suitable to achieve a desired brown color and flavor based on a desired brine solution uptake of about 8 wt. %. to about 15 wt. %.

Eight brine solutions were prepared having various concentrations of sodium nitrite. Each brine solution contained about 15 wt. % sodium chloride, based on the total weight of the solution, and about 6 wt. % smoke flavoring, based on the total weight of the solution. Each brine solution also contained a different amount of sodium nitrite, as follows (expressed as a weight percent based on the total weight of the solution): 0, 0.019, 0.028, 0.038, 0.047, 0.094, 0.152, and 0.190.

Side pork was sliced to a thickness of about 1 mm to about 2 mm, then the slices were dipped into one of the various brine solutions for about fifteen seconds, and allowed to drip for about fifteen seconds. Next, the strips were heated in a conventional household microwave oven until about a 30–35% yield was achieved.

From the tests performed in Example 5, and based on an 8 wt. % uptake of brine solution by the bacon strips, the following is the amount of sodium nitrite present in the bacon strips of Example 5 prior to cooking.

| Brine Solution (wt. % NaNO$_2$) | Brine Solution (wt. % NaNO$_2$) | Bacon Slices Before Cooking (ppm NaNO$_2$)[1] |
|---|---|---|
| 0 | 0 | 0 |
| 0.019 | 190 | 15.2 |
| 0.028 | 280 | 22.4 |
| 0.038 | 380 | 30.4 |
| 0.047 | 470 | 37.6 |
| 0.094 | 940 | 75.2 |
| 0.152 | 1520 | 121.6 |
| 0.190 | 1900 | 152.0 |

[1]Based on 8 wt. % brine uptake.

Visual inspection of cooked bacon products resulting from the treated bacon slices of Example 5 by a consumer panel shows that unacceptable bacon products result from bacon slices incorporating 121.6 ppm NaNO$_2$. Bacon products containing 75.2 ppm NaNO$_2$ were consumer acceptable.

The consumer panel determined that a level of about 0.019 wt. % to about 0.028 wt. % sodium nitrite provided an excellent cured color in the finished bacon product. The panel also determined that at a sodium nitrite level significantly above about 0.094 wt. % (i.e., 121.6 ppm NaNO$_2$) resulted in an unacceptably red finished bacon product. Accordingly, Example 5 shows that the amount of sodium nitrite to add to the bacon (having about an 8 wt. % to about a 15 wt. % uptake of brine solution) is about 0.015 wt. % to about 0.095 wt. %, based on the total weight of the solution, and most preferably about 0.025 wt. % to about 0.05 wt. %, based on the total weight of the brine solution, i.e., about 20 to about 40 ppm sodium nitrite, based on the green weight of the bacon.

These results are both surprising and unexpected based on the teachings of prior patents, such as Wilson et al. U.S. Pat. No. 5,997,925 and Olander et al. U.S. Pat. No. 4,957,756, both of which teach using a minimum amount of NaNO$_2$ greater than the presently claimed amount of NaNO$_2$ in the uncooked bacon slices. In addition, the present method provides an additional benefit over the teachings of these patents because the reduced amount of sodium nitrite not only provides a consumer acceptable bacon product, but also increases product safety. Reducing the amount of sodium nitrite in the bacon slices also reduces the formation of carcinogenic N-nitrosamines that arise during cooking from a reaction between sodium nitrite and certain amines naturally present in pork bellies.

Example 6

Tests were performed to determine whether a smoke flavoring agent is a necessary ingredient in the brine solution with respect to providing a consumer acceptable color of the finished bacon product and with respect to modifying the yield.

A first brine solution containing about 15 wt. % sodium chloride, based on the total weight of the solution, about 0.02 wt. % sodium nitrite, based on the total weight of the solution was prepared. The brine solution was free of a smoke flavoring agent (e.g., a liquid smoke composition). Side pork was sliced to a thickness of about 1 mm to about 2 mm, then immersed into the brine solution for about fifteen seconds and allowed to drip for about fifteen seconds. Next, the strips were heated in a conventional household microwave oven.

The finished bacon had a suitable cured color, but was lacking smoke flavor. The uptake for this bacon was about 9.5 wt. % to about 10 wt. % of brine solution. Hence, it was determined that the smoke flavoring agent is not an essential ingredient with respect to providing a consumer acceptable color or to modifying the yield.

Example 7

Tests were performed to determine whether a phosphate is necessary to improve or control brine uptake by the side pork when the side pork is immersed in the brine solutions, and whether the level of sodium nitrite in the brine solution is maintained by the presence of phosphate.

A first brine solution containing about 15 wt. % sodium chloride based on the total weight of the solution and about 6 wt. % smoke flavoring based on the total weight of the solution was prepared. This brine solution was free of phosphates.

A second brine solution containing about 15 wt. % sodium chloride, based on the total weight of the solution, about 6 wt. % smoke flavoring, based on the total weight of the solution, and about 0.5 wt. % tetrasodium pyrophosphate, based on the total weight of the solution was prepared. The presence of phosphate in the brine solution caused an increase in the solution pH of the second solution from about 4.5 to 6.2.

Sliced side pork was processed as in Example 1 with each of the first and second brine solutions to produce finished bacon products. With respect to color, flavor, and brine uptake, the finished bacon product made from the first brine solution was essentially identical to the finished bacon product made from the second brine solution. It was found, however, that phosphate was needed to maintain sodium nitrite levels in the brine solution. Sodium nitrite was analyzed using a colorimetric test at 0, 2, 4, 6, and 24 hours after the addition of the sodium nitrite. The brine solution at a pH of about 6.2 maintained the initial nitrite level for a minimum of 24 hours. Accordingly, this example shows that phosphates are not required to improve, or control, brine uptake by the side pork when dipped, but that phosphates maintain the level of sodium nitrite in the brine solution.

Example 8

Tests were performed to determine the amount of sodium nitrite present in a bacon slice prior to cooking that provides consumer-acceptable food products prepared by the present method.

In these tests, side pork first was sliced into strips about one to about two millimeters in thickness. The slices then were laid flat on a cookie sheet and frozen.

The following brine solutions (a) through (f) also were prepared independently:

| Solution | Water (g) | Salt[1] (g) | Trisodium Phosphate (g) | P50[2] (g) | Sodium Nitrite (g) |
|---|---|---|---|---|---|
| (a) | 210 | 40 | 1.35 | 10 | 0 |
| (b) | 210 | 40 | 1.35 | 10 | 0.05 |
| (c) | 210 | 40 | 1.35 | 10 | 0.10 |
| (d) | 210 | 40 | 1.35 | 10 | 0.20 |
| (e) | 210 | 40 | 1.35 | 10 | 0.30 |
| (f) | 210 | 40 | 1.35 | 10 | 0.35 |

[1] sodium chloride, and
[2] AROSMOKE P50 ®.

Solutions (a)–(f) were prepared by first adding the trisodium polyphosphate to the warm water, and mixing the resulting mixture until the trisodium phosphate was dissolved. Then, the salt was added to the resulting solution, and the resulting mixture was mixed until the salt was completely dissolved. The P50 then was mixed into the resulting solution. Just prior to using the resulting brine, a desired, predetermined amount of sodium nitrite was added to individual solutions, and the resulting mixture was stirred until the sodium nitrite was completely dissolved.

The pork slices then were removed from the freezer and allowed to warm to up a point such that the cold slices could be bent without breaking. The pork slices then were immersed into one of brine solutions (a) through (f) for 30 seconds, removed from the solution, and allowed to drip dry for approximately 30 seconds. The solution-treated slices were placed on a paper plate, then into a microwave oven. The slices were cooked for about 2 to 2½ minutes to achieve a 35–45% yield of cooked bacon product. The resulting bacon product then was allowed to cool at room temperature prior to analysis for generation of a red color.

A Minolta CR300 with a Minolta Data Processor DP301 (Minolta Corporation, Ramsey, N.J.) was used to analyze for color formation by measuring $L^*a^*b$ color values of the cooked bacon products. Four replicate readings were taken for each bacon strip for each test parameter. The four readings then were analyzed statistically to provide a mean and a standard deviation for each set of data. The "a" value of the measurement was analyzed in detail because the "a" value provides data in the green (−a values) to red (+a values) color quadrant. As known to persons skilled in the art, when the "a" value increases, the red color of the cooked bacon product also increases.

The mean "a" values were graphed versus the corresponding nitrite level (in ppm) of the uncooked bacon slice in FIG. 1. From FIG. 1, and from taste testing, a control bacon product (0 ppm nitrite in the bacon slice) exhibited a cooked pork taste and color (i.e., essentially colorless "a" value of less than 8) as opposed to a cooked bacon product taste and color. However, at 18 ppm sodium nitrite in the bacon slice, a cooked bacon product prepared in accordance with the present invention provided the recognized and well-known taste and color of cooked commercial bacon.

In addition, slices of commercial bacon, namely samples of Oscar Mayer, Hillshire Farms, and Patrick Cudahy bacon, were purchased at a supermarket. Two slices of raw bacon from each package were cooked as described above for the test slices. The commercial cooked bacon also was measured for the generation of a red color as described above. The mean "a" value was 13.15 for the Oscar Mayer product, 14.86 for the Hillshire Farms product, and 10.03 for the Patrick Cudahy, product. All commercial bacon product were consumer acceptable. Each commercial bacon, before cooking, has a sodium nitrite content of at least 120 ppm. Correlating these values to FIG. 1 shows that a consumer-acceptable bacon made by the present method contains an unexpectedly low amount of about 18 up to about 80 ppm sodium nitrite prior to cooking.

In particular, FIG. 1 shows that a cooked bacon slices having a sodium nitrite level of about 18 ppm exhibits an "a" value for the cooked bacon of about 10.75, and a nitrite level of 87 ppm exhibits an "a" value of about 15. Accordingly, a consumer-acceptable bacon product manufactured by the present method has an "a" value of about 10 to about 15. For an "a" value below 10, the bacon product has a commercially unacceptable low pale color. For an "a" value above 15, the bacon product has a commercially unacceptable high red color. In preferred embodiments, the "a" value of a cooked bacon product produced by the present invention is about 11 to about 14, and to achieve the full advantage of the present invention the "a" value is about 12 to about 13.

What is claimed is:

1. A method of making a bacon product from a frozen bacon belly, the method comprising the steps of:

(a) slicing the frozen bacon belly to provide bacon slices;

(b) coating the bacon slices with an aqueous brine solution including sodium nitrite to provide brine-soaked bacon slices having a weight uptake of the brine solution of about 8 wt. % to about 15 wt. %, based on the total weight of the frozen bacon belly of step (a); and, (c) heating the brine-soaked slices obtained from step (b) to form the bacon product, wherein the bacon slices contain about 18 ppm up to about 80 ppm sodium nitrite.

2. The method of claim 1 further comprising the step of partially thawing the bacon slices obtained from step (a) to a temperature of about minus 10° C. to about minus 4° C. prior to the coating step (b).

3. The method of claim 1 wherein the brine solution is applied in step (b) by spraying the brine solution onto the bacon slices.

4. The method of claim 1 wherein the bacon slices have a thickness of about 0.5 mm to about 4 mm.

5. The method of claim 1 wherein the coating step (b) comprises drenching or immersing the slices in the brine solution for about 5 seconds to about 10 seconds.

6. The method of claim 1 wherein the aqueous brine solution comprises:

(a) about 10 wt. % to about 20 wt. % of sodium chloride, potassium chloride, or a mixture thereof, based on the total weight of the brine solution;

(b) about 0.015 wt. % to about 0.04 wt. % sodium nitrite, sodium nitrate, or a mixture thereof, based on the total weight of the brine solution; and, (c) 0 wt. % to about 1 wt. % of a phosphate, based on the total weight of the brine solution.

7. The method of claim 6 wherein the aqueous brine solution comprises about 70 wt. % to about 90 wt. % water, based on the total weight of the brine solution.

8. The method of claim 6 wherein the aqueous brine solution comprises about 10 wt. % to about 18 wt. % sodium chloride, based on the total weight of the solution.

9. The method of claim 6 wherein the brine solution further comprises a material selected from the group consisting of sugar, sodium ascorbate, a smoke flavoring agent, and mixtures thereof.

10. The method of claim 6 wherein the brine solution further comprises about 1 wt. % to about 8 wt. % of a smoke flavoring agent.

11. The method of claim 6 wherein the brine solution further comprises about 1 wt. % to about 6 wt. % of a smoke flavoring agent.

12. The method of claim 1 wherein the bacon slices contain about 20 ppm to about 75 ppm sodium nitrite.

13. The method of claim 1 wherein the bacon slices contain about 20 ppm to about 60 ppm sodium nitrite.

14. The method of claim 1 wherein the bacon slices contain about 20 ppm to about 50 ppm sodium nitrite.

15. The method of claim 1 wherein the bacon slices contain about 20 ppm to about 40 ppm sodium nitrite.

16. The method of claim 1 wherein the bacon product has an "a" color value of about 10 up to 15.

17. The method of claim 1 wherein the bacon product has an "a" color value of about 11 to about 14.

18. The method of claim 1 wherein the bacon product has an "a" color value of about 12 to about 13.

19. The method of claim 1 wherein the bacon slices contain about 10 wt. % to about 12 wt. % brine based on the total weight of the bacon belly of step (a).

20. The method of claim 1 wherein the bacon product has a weight percent yield of about 20 to about 50 based on the total weight of the bacon belly of step (a).

21. The method of claim 20 wherein the bacon product has a weight percent yield of about 25 to about 45 based on the total weight of the bacon belly of step (a).

22. The method of claim 1 wherein the frozen bacon bellies are maintained at an internal temperature of about minus 35° C. to about minus 15° C.

23. The method of claim 1 wherein the frozen bacon bellies are maintained at about minus 20° C. to about minus 26° C.

24. The method of claim 1 wherein, in step (b), the bacon slices are coated with the aqueous brine solution at a temperature of less than about 0° C.

25. The method of claim 1 wherein, in step (b), the bacon slices are coated with the aqueous brine solution at a temperature of about minus 10° C. to about minus 4° C.

* * * * *